United States Patent
Del Fabro

(10) Patent No.: US 12,358,041 B2
(45) Date of Patent: Jul. 15, 2025

(54) DEVICE FOR PICKING UP BARS AND CORRESPONDING METHOD

(71) Applicant: M.E.P. MACCHINE ELETTRONICHE PIEGATRICI S.P.A., Reana del Rojale (IT)

(72) Inventor: Giorgio Del Fabro, Udine (IT)

(73) Assignee: M.E.P. Macchine Elettroniche Piegatrici S.P.A., Reana del Rojale (IT)

( * ) Notice: Subject to any disclaimer, the term of this patent is extended or adjusted under 35 U.S.C. 154(b) by 0 days.

(21) Appl. No.: 18/573,279

(22) PCT Filed: Jun. 23, 2022

(86) PCT No.: PCT/IT2022/050179
§ 371 (c)(1),
(2) Date: Dec. 21, 2023

(87) PCT Pub. No.: WO2022/269650
PCT Pub. Date: Dec. 29, 2022

(65) Prior Publication Data
US 2024/0316616 A1    Sep. 26, 2024

(30) Foreign Application Priority Data
Jun. 24, 2021    (IT) .................. 102021000016619

(51) Int. Cl.
*B21F 23/00*    (2006.01)
*B65G 47/14*    (2006.01)

(52) U.S. Cl.
CPC ........ *B21F 23/007* (2013.01); *B65G 47/1485* (2013.01)

(58) Field of Classification Search
CPC .... B21D 43/006; B21F 23/005; B21F 23/007; B65G 2201/0217
USPC ......... 414/745.7, 745.1, 746.1, 746.2, 745.8, 414/746.6, 746.7, 746.8, 746.4
See application file for complete search history.

(56) References Cited

U.S. PATENT DOCUMENTS 3,144,139 A * 8/1964 Chapellier ........... B21D 43/006
414/745.9
3,823,812 A * 7/1974 Sieurin ................. B21B 43/006
198/430
(Continued)

FOREIGN PATENT DOCUMENTS

DE    29714110 U1 * 10/1997 ............ B21F 23/005
EP    1934000 A1    6/2008
(Continued)

OTHER PUBLICATIONS

International Search Report and Written Opinion for corresponding International PCT Application No. PCT/IT2022/050179, dated Oct. 17, 2022.

*Primary Examiner* — Gregory W Adams
(74) *Attorney, Agent, or Firm* — K&L Gates LLP

(57) ABSTRACT

Pick-up device (10) configured to selectively pick up and extract at least one bar (B) from a plurality of bars (B) disposed on a feed plane (111) and to position it on a delivery plane (12), said pick-up device (10) comprising a support arm (11) terminally provided with a pick-up head (12). The present invention also concerns an apparatus (100) for feeding bars (B) comprising the device (10) as above and a corresponding method for picking up bars (B).

9 Claims, 4 Drawing Sheets

(56) References Cited

U.S. PATENT DOCUMENTS

| | | | |
|---|---|---|---|
| 6,808,359 B2* | 10/2004 | Miglioranza | B21F 23/005 |
| | | | 414/745.9 |
| 7,832,976 B2 | 11/2010 | Miglioranza | |
| 9,028,198 B2* | 5/2015 | Schopf | B23Q 7/08 |
| | | | 414/745.1 |
| 11,648,603 B2 | 5/2023 | Del Fabro | |
| 2009/0007621 A1* | 1/2009 | Del Fabro | B21D 43/006 |
| | | | 72/428 |
| 2011/0008143 A1* | 1/2011 | Del Fabro | B21F 23/007 |
| | | | 414/800 |

FOREIGN PATENT DOCUMENTS

| | | |
|---|---|---|
| EP | 2412456 A1 | 2/2012 |
| KR | 20190103262 A | 9/2019 |
| WO | 2022269650 A1 | 12/2022 |

* cited by examiner

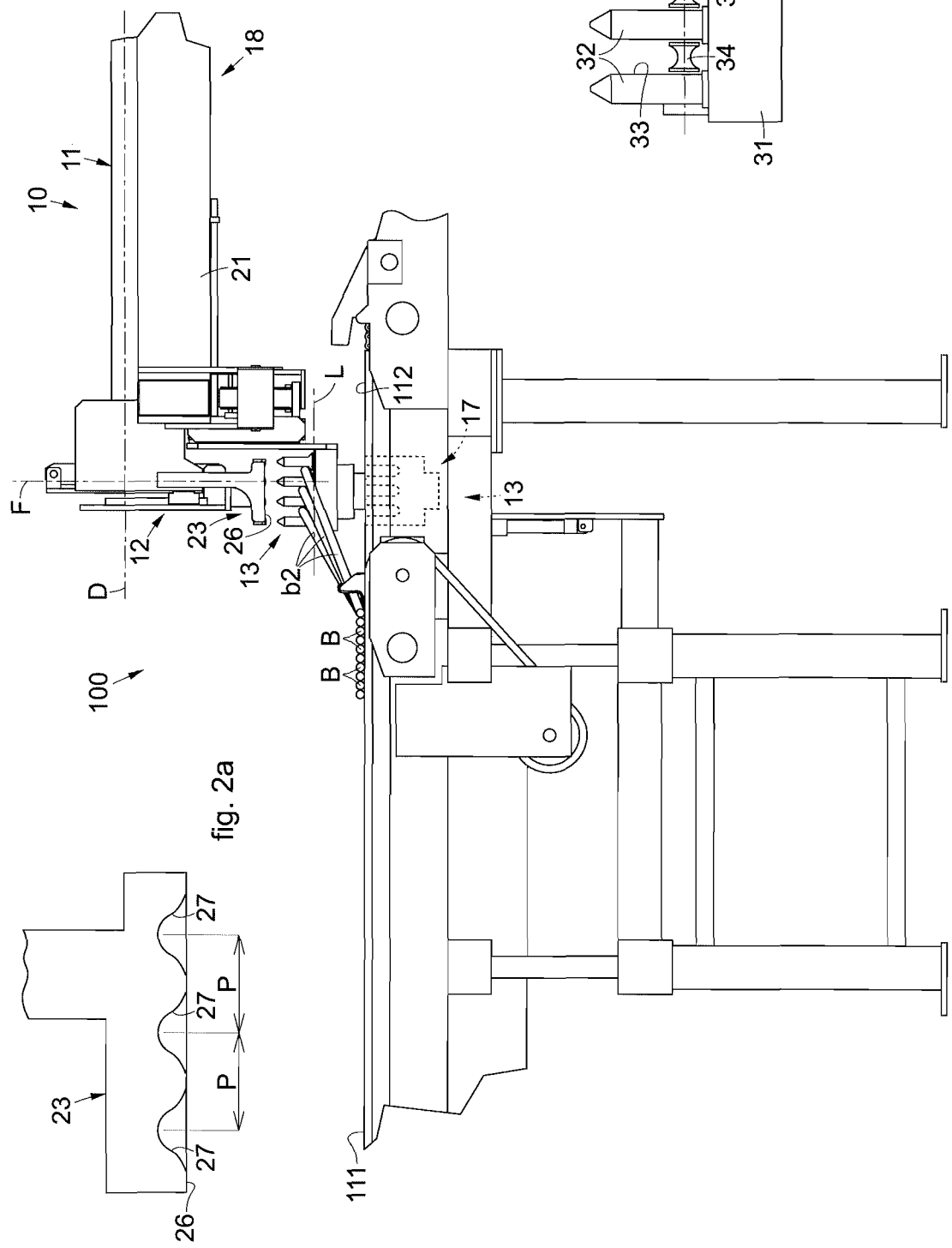

DEVICE FOR PICKING UP BARS AND CORRESPONDING METHOD

CROSS-REFERENCE TO RELATED APPLICATIONS

This application is a U.S. National Stage Entry under 35 U.S.C. § 371 of International Patent Application No. PCT/IT2022/050179, entitled DEVICE FOR PICKING UP BARS AND CORRESPONDING METHOD, filed Jun. 23, 2022, which claims benefit of Italian Patent Application No. 102021000016619, filed Jun. 24, 2021, the entire disclosures of which are hereby incorporated by reference herein.

FIELD OF THE INVENTION

The present invention concerns a device for picking up bars, in particular metal bars used, for example, in the construction field such as, by way of example, wire rod, reinforcement rods, bars, round pieces, square bars or suchlike.

In particular, the device according to the invention and the corresponding method are suitable to pick up, substantially automatically, one or more bars at a time from a feed plane and to dispose them on a delivery plane or directly on a processing machine.

BACKGROUND OF THE INVENTION

In the field of feeding bars to a user machine, for example a bending machine, a stirrup bender machine, a welding machine or a cutting machine, it is often required to supply bars which are picked up by means of bridge cranes or suchlike, from suitable stores, and disposed on a feed apparatus that sends them to a station or machine.

Typically, the bars are supplied in the form of a bundle, scattered randomly, entangled or twisted with each other, on a feed plane equipped with feed means which are driven to make the bars advance, causing them to vibrate so as to at least partly separate them.

The bars are then picked up, individually or in groups, by means of suitable pick-up devices, for example magnetic pick-up arms, to be delivered directly to the user machine or downstream, by means of an inclined plane, a roller way or other transfer means which in addition to moving them can also give a cadence to their advance, according to needs.

However, it often happens that the pick-up devices are not able to extract the correct and desired number of bars and/or that the bars are picked up randomly, without a particular spatial orientation. This can cause both errors in counting the bars and also the need to correctly reposition the bars moved, causing waste of time, inefficiencies and increased costs.

Especially in the case of very long bars, which can exceed 25 m, these remain in any case twisted, generally in correspondence with their ends, making it very difficult to pick up the bars, and during this step they can in any case be subjected to flexions or curving. Therefore, once picked up and taken to their destination, the bars may be in positions or conditions that are not suitable for use.

The devices for picking up bars known from documents EP 1 934 000 A1, KR 2019 0103262 A and EP 2 412 456 A1 do not solve the disadvantages described above, therefore there is a need to perfect a device for picking up bars and a corresponding method which can overcome at least one of the disadvantages of the state of the art.

In order to do this, it is necessary to solve the technical problem of picking up a single bar or more than one bar at a time, for example from a feed plane of an apparatus for feeding bars, to position it on a subsequent delivery plane so that the bars are in a substantially linear condition with respect to their direction of development.

In particular, one purpose of the present invention is to provide a device for picking up bars which, in an automated manner, is able both to pick up one or more of the bars at a time, and also to keep them in or bring them back to a substantially linear condition before depositing them on the delivery plane.

Another purpose is to be able to operate on bars of substantially any length, as well as to ensure they are picked up with a count that is free from errors caused by unwanted overlapping or multiple pick-ups.

Another purpose of the present invention is to provide an apparatus for feeding bars provided with said pick-up device.

Another purpose of the present invention is to provide a method for picking up bars which is automated and allows to pick up one or more of said bars at a time, keeping them in or bringing them back to a substantially linear condition before depositing them, for example, on a delivery plane of an apparatus for feeding bars. The Applicant has devised, tested and embodied the present invention to overcome the shortcomings of the state of the art and to obtain these and other purposes and advantages.

SUMMARY OF THE INVENTION

The present invention is set forth and characterized in the independent claims. The dependent claims describe other characteristics of the present invention or variants to the main inventive idea.

In accordance with the above purposes, a pick-up device has been devised which is configured to selectively pick up and extract at least one bar from a plurality of bars disposed on a feed plane, in order to position it on a delivery plane, and comprising a support arm terminally provided with a pick-up head.

In accordance with one aspect of the present invention, the pick-up device comprises temporary support means that have at least one central support configured to support a central portion of the at least one bar, and lateral supports mobile away from the central support, in a transverse direction, in order to support and extract respective lateral portions of the at least one bar, aligning them to the central portion.

In accordance with another aspect of the present invention, the temporary support means comprise vertically mobile secondary supports, normally disposed at a lower height than that of the central support and of the lateral supports.

Furthermore, in the present invention, the support arm can be configured to move the pick-up head in a linear positioning direction that takes it closer to/away from the temporary support means.

Again in the present invention, the pick-up head can comprise a gripping matrix mobile in an operating direction that is transverse both with respect to the positioning direction and also with respect to the transverse direction.

The gripping matrix can be made in whole or in part, or it can be at least coated, with a magnetic or electromagnetic material and it has a gripping surface provided with a plurality of gripping seatings that have a downward concavity and are distanced from each other by a predetermined pitch.

The central support can be provided with seatings that are distanced by the predetermined pitch as above and have a greater depth than a transverse measurement of the bars. Furthermore, the seatings are disposed on two facing rows distanced apart in the transverse direction by an internal distance greater than a width of the gripping matrix.

In accordance with one aspect of the present invention, each lateral support can comprise a base plate from which pegs or pins project vertically, defining between them straightening channels for the passage of the at least one bar.

Finally, the secondary supports can be disposed aligned in the transverse direction and equally spaced apart so as to sustain the at least one bar for its entire, or almost its entire, length.

In accordance with other embodiments, there is provided an apparatus for feeding bars comprising a feed plane on which a plurality of the bars is able to be disposed, a delivery plane downstream of the feed plane and a device for picking up bars as above.

In accordance with other embodiments, there is also provided a method for picking up bars which is able to selectively pick up and extract at least one bar from a plurality of bars disposed on a feed plane of an apparatus for feeding bars, and to position it on a delivery plane with a pick-up device by moving a support arm terminally provided with a pick-up head.

In accordance with one aspect of the present invention, the method provides to temporarily support the at least one bar on temporary support means, wherein a central support supports a central portion of the at least one bar, and lateral supports are moved away from the central support in a transverse direction in order to support and extract respective lateral portions of the at least one bar, aligning them with the central portion.

DESCRIPTION OF THE DRAWINGS

These and other aspects, characteristics and advantages of the present invention will become apparent from the following description of some embodiments, given as a non-restrictive example with reference to the attached drawings wherein:

FIG. 2 is a lateral view of FIG. 1;

FIGS. 2*a* and 2*b* schematically show enlarged details of FIG. 2;

Figure 1:
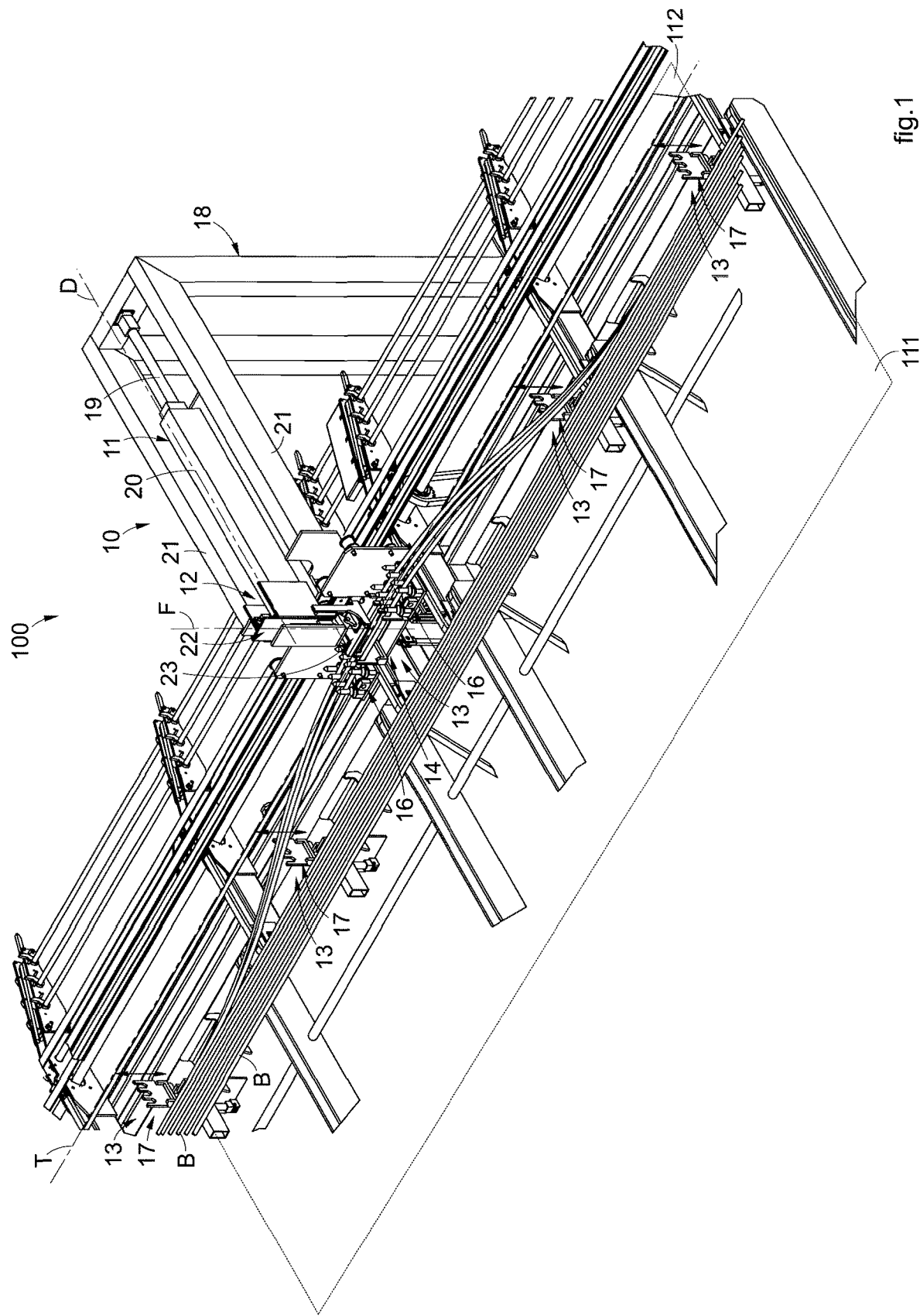
FIG. 1 is a three-dimensional view of a device for picking up bars, according to the present invention, which is part of an apparatus for feeding bars.

We must clarify that in the present description the phraseology and terminology used, as well as the figures in the attached drawings also as described, have the sole function of better illustrating and explaining the present invention, their function being to provide a non-limiting example of the invention itself, since the scope of protection is defined by the claims.

To facilitate comprehension, the same reference numbers have been used, where possible, to identify identical common elements in the drawings. It is understood that elements and characteristics of one embodiment can be conveniently combined or incorporated into other embodiments without further clarifications.

DESCRIPTION OF AN EMBODIMENT OF THE PRESENT INVENTION

With reference to FIG. 1, a pick-up device 10 for picking up bars B is shown, associated with an apparatus 100 for feeding such bars B which is suitable to be placed upstream of a processing machine, such as a stirrup bender machine, a shaping machine, a bending machine, a tying machine, a cropper or any other similar type of machine.

The bars B have a mainly oblong development and can even have lengths of several meters, possibly with different diameters and surface finishes, and they can be supplied to the apparatus 100 in loose form or tied in bundles.

The apparatus 100, shown only in part, comprises a feed plane 111 on which a plurality of bars B is able to be disposed and, downstream of the plane 111, a delivery plane 112.

The device 10 is configured to selectively pick up and extract at least one bar B from the plurality of bars B disposed on the feed plane 111 in order to position it on the delivery plane 112. In the example described here, the pick-up device 10 is configured to pick up three B bars at a time, but it could pick up either more or fewer bars B.

The device 10 for picking up the bars B, from a central portion b1 thereof, comprises a support arm 11 terminally provided with a pick-up head 12.

The device 10 also comprises temporary support means 13 that have at least one central support 14, which is configured to support the central portions b1 of the bars B picked up by the pick-up head 12, and two lateral supports 16 that are mobile away from the central support 14 in a transverse direction T in order to support and extract respective lateral portions b2, b3 of the bars B, aligning them to the central portions b1.

In fact, when the bars B are picked up with respect to their central portion b1, the lateral portions b2, b3 still remain on the feed plane 111, possibly twisted or overlapping with the other bars B present therein. While the central support 14, in cooperation with the pick-up head 12, keeps the central portions b1 of the bars B fixed, the lateral supports 16 move, starting from a position close to the central support 14 and moving away from the latter, performing a kind of "combing" of the lateral portions b2, b3 of the bars B which are therefore completely extracted from those present on the feed plane 111 and aligned with respect to their longitudinal development.

The temporary support means 13 can comprise secondary supports 17, normally disposed in a lowered position at a lower height than that of the central support 14 and of the lateral supports 16, and vertically mobile toward a raised position in which they are aligned at the same height as the central support 14 and of the lateral supports 16 in order to support respective sections of the lateral portions b2, b3 that have just been straightened and aligned by the lateral supports 16. In particular, in the lowered position the secondary supports 17 are below the delivery plane 112, while in the raised position they are above it.

The central support 14 is mobile vertically downward, simultaneously with the vertical movement of the secondary supports 17 between a raised holding position, in which it receives the bars B from the pick-up head 12, and a lowered delivery position, in order to position the bars B, which have just been extracted and aligned, on the delivery plane 112. In the raised holding position the central support 14 is above the delivery plane 112, while in the lowered delivery position it is below it.

According to some embodiments, the support arm 11 has a substantially linear development and can be of the telescopic or piston type.

The support arm 11 is configured to cause a substantially linear displacement of the pick-up head 12 in a positioning direction D. This substantially linear displacement allows to dispose the pick-up head 12 alternatively at least above the feed plane 111 in order to pick up the bars B, and above the temporary support means 13 in order to position and release the bars B.

In this specific case, the support arm 11 is disposed in a middle position with respect to lateral ends of the feed plane 111 and of the support plane 112, respectively (FIG. 1).

The support arm 11 is mounted on a framework 18 and comprises a fixed part 19 and a mobile part 20 sliding with respect to the fixed part 19 and terminally provided with the pick-up head 12. The fixed part 19 develops cantilevered with respect to the framework 18 in the positioning direction D, which is the direction in which the mobile part 20 is able to translate to suitably position the pick-up head 12.

The pick-up head 12, in turn, comprises a fixed support part 22 and a gripping matrix 23. The gripping matrix 23 is sliding with respect to the support part 22 in an operating direction F that is transverse to the positioning direction D and to the transverse direction T. The operating direction F is directed toward the feed plane 111 or the delivery plane 112 of the apparatus 100. In the example of FIG. 1, the operating direction F is substantially orthogonal to the positioning direction D and orthogonal both to the feed plane 111 and also to the delivery plane 112. In other words, the gripping matrix 23 is mobile toward/away from the feed plane 111 or the 112 delivery plane.

The pick-up head 12 is magnetic or electromagnetic. In particular, the gripping matrix 23 is made in whole or in part, or it is at least coated in whole or in part, with a magnetic or electromagnetic material capable of generating an attractive force such as to lift, that is, at least partly extract with respect to the other bars B present on the feed plane 111, at least one bar B at a time advantageously only with respect to its central portion b1.

With reference to FIG. 2, the gripping matrix 23 comprises a gripping surface 26 facing, on each occasion, the upper part of the bars B to be picked up or the upper part of the temporary support means 13. The gripping surface 26 is, therefore, facing on each occasion the feed plane 111 or the delivery plane 112, and it is substantially parallel with respect to the latter.

A plurality of gripping seatings 27 are created on the gripping surface 26.

The gripping seatings 27 have a downward concavity and are configured to each receive a respective bar B. In particular, each gripping seating 27 can have a hollow shape, for example semi-cylindrical or of another shape, terminally open in the longitudinal direction and conformed to accommodate a portion of the bar B. In the example described here, the gripping surface 26 is provided with three gripping seatings 27; however, as mentioned, it is not excluded that the number of gripping seatings 27 may be greater or smaller than such number.

The gripping seatings 27 are distanced from each other by a predetermined pitch P which can be the same between one gripping seating 27 and the other, or different.

Advantageously, the presence of the gripping seatings 27, and not a flat or otherwise prepared surface, allows both to engage the bars B in a more secure manner and also to pre-distance them without needing subsequent distancing operations. Furthermore, the presence of the gripping seatings 27 allows to pick up, in a definite way, only the planned and desired number of bars B.

According to one possible embodiment, the gripping matrix 23 is of the type that can be replaced if a different distancing between the bars B to be picked up or a different number of bars B is required.

According to some embodiments, the central support 14 can be associated with the framework 18, for example at a terminal end of a beam or a pair of beams 21 protruding cantilevered above the delivery plane 112.

Figure 1A:
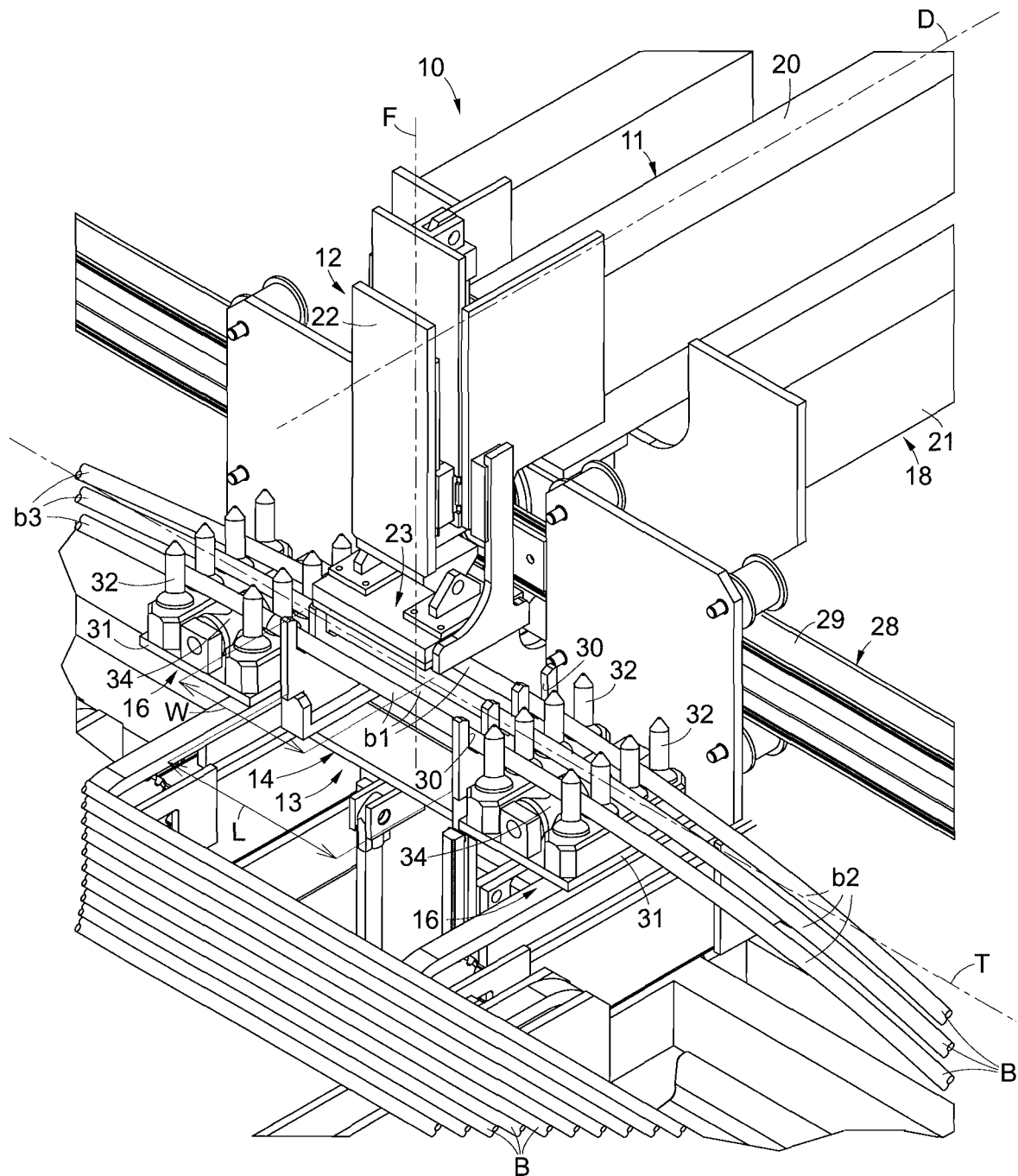
FIG. 1*a* is an enlarged detail of FIG. 1.

The lateral supports 16 are sliding on guide means 28, in this specific case a tubular rail 29 which develops in the transverse direction T (FIG. 1*a*). The rail 29 can also be attached to the same pair of beams 21. In particular, the lateral supports 16 are mobile between a central close position, in which they are laterally side by side to the central support 14, and an end distanced position, in which they are located at a distance from the central support 14 that is greater than the length of the processed bars B.

The central support 14 and the two lateral supports 16 are normally disposed above the delivery plane 112 and at a different height, in particular higher, than that of the feed plane 111. In this way, the initial extraction of the bars B is facilitated because a first release of the bars B picked up with respect to those present on the feed plane 111 already occurs. Furthermore, picking up the bars B with respect to their central portions b1 considerably reduces the effort required by the pick-up head 12, since the bars B normally intertwine and overlap in correspondence with their ends.

The central support 14 can be vertically mobile in order to pass from a position above the delivery plane 112 to a position below it, then returning to the starting position. The vertical movement of the central support 14 is coordinated with that of the secondary supports 17, so that the bars B descend parallel to each other, without inclining or deforming.

Furthermore, the central support 14 can be provided with seatings 30 that have upward concavity and are configured to support in position the bars B that have been released/positioned by the pick-up head 12.

The seatings 30 are disposed facing each other and aligned in pairs in order to define two support points for each bar B.

Advantageously, the seatings 30 are designed with the same number and spacing as the gripping seatings 27 of the gripping matrix 23.

The seatings 30 have a greater depth than the diameter, or more generally a transverse size, of the bars B that they have to contain. Furthermore, the seatings 30 are disposed on two facing rows distanced from each other in the transverse direction T by an internal distance L greater than a width W of the gripping matrix 23 (FIG. 1*a*). In this way, when the pick-up head 12 descends to position the bars B, it can keep them firmly in position while the lateral supports 16 act in the transverse direction T.

According to some embodiments, each lateral support 16 comprises a base plate 31 from which pegs, or pins, 32 project vertically, defining between them straightening channels 33 for the passage of the bars B. The straightening channels 33 are aligned with the seatings 30 of the central support 14.

More specifically, there is provided a first line of pegs 32 which are distanced from each other by a measure at least slightly greater than the diameter of the bars B, and a second line of pegs 32 facing the first line and distanced with respect to the latter in the transverse direction T.

Figure 3A:
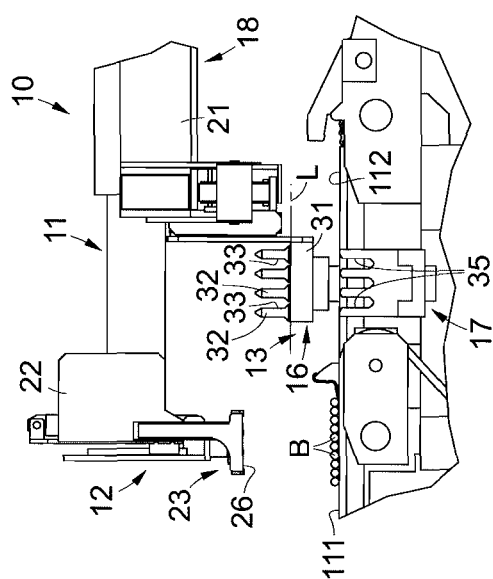
FIGS. 3*a*-3*d* show operating steps of the method for picking up bars according to the present invention.
Figure 3B:
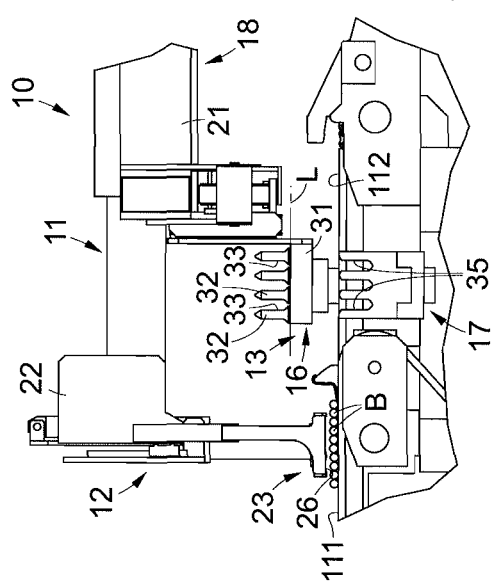
Figure 3C:
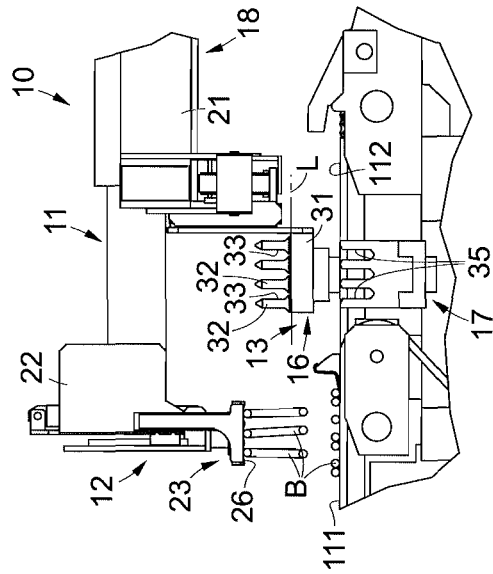
Figure 3D:
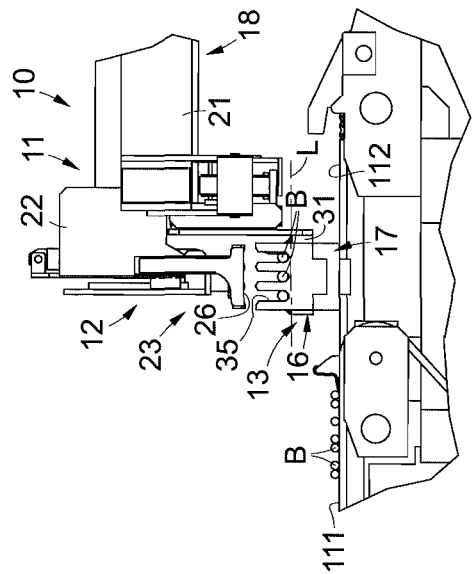

Between the first and the second line of pegs 32 there are rollers 34 on which the portion of the bar B which is supported in the straightening channels 33 is able to rest (FIG. 1a and FIG. 3b). In this way, when the lateral supports 16 move in the transverse direction T to recover and straighten the bars B, friction is limited.

The secondary supports 17 are disposed aligned in the transverse direction T and equally spaced apart in such a way as to sustain the bars B in segments for their entire length.

The lateral supports 16 have a lateral movement amplitude such as to go beyond the last secondary supports 17 on both sides, so as to completely release the bars B at the end of the "combing" and leave them resting only on the central support 14 and on the secondary supports 17 which, as stated, are mobile in order to deposit the bars B on the delivery plane 112.

The secondary supports 17 are provided with inlets 35, each able to support a respective bar B section. When the secondary supports are in a raised position, the inlets 35 are aligned both to the straightening channels 33 and also to the seatings 30 of the central support 14. The seatings 30, the straightening channels 33 and the inlets 35 define a temporary support plane L for the bars B, indicated for example in FIG. 2 and FIGS. 3a-3d.

According to some embodiments, shown in FIGS. 3a-3d, there is provided a method for picking up bars B according to the present invention, with which it is provided to selectively pick up and extract at least one bar B from a plurality of bars B disposed on the feed plane 111 of the apparatus 100 and to position it on the delivery plane 112 with the pick-up device 10 by moving the support arm 11 terminally provided with the pick-up head 12.

The method provides to temporarily support the at least one bar B, for example three bars B, on the temporary support means 13, wherein the central support 14 stably supports the central portion b1 of the at least one bar B, and the lateral supports 16 are moved away from the central support 14 in the transverse direction T in order to support and extract respective lateral portions b2, b3 of the at least one bar B, aligning them to the central portion b1.

It is clear that modifications and/or additions of parts may be made to the device 10 for picking up bars and to the method as described heretofore, without departing from the field and scope of the present invention, as defined by the claims.

It is also clear that, although the present invention has been described with reference to some specific examples, a person of skill in the art shall certainly be able to achieve many other equivalent forms of device and corresponding method for picking up bars, having the characteristics as set forth in the claims and hence all coming within the field of protection defined thereby.

In the following claims, the sole purpose of the references in brackets is to facilitate reading and they must not be considered as restrictive factors with regard to the field of protection defined by the same claims.

The invention claimed is:

1. A pick-up device (10), comprising:
a support arm (11) terminally provided with a pick-up head (12), configured to selectively pick up and extract, from a feed plane (111), at least one bar (B) in order to position the bar on a delivery plane (112), wherein said pick-up device (10) comprises:
a temporary support means (13) comprising:
at least one central support (14) provided with seatings (30) configured to support a central portion (b1) of said at least one bar (B);
lateral supports (16) movable away from said central support (14) in a transverse direction (T), said lateral supports (16) configured to support and extract lateral portions (b2, b3) of said at least one bar (B) to align said lateral portions to said central portion (b1); and
vertically movable secondary supports (17) disposed at a lower height than that of said central support (14) and said lateral supports (16).

2. The pick-up device (10) of claim 1, wherein said support arm (11) is configured to move said pick-up head (12) in a first linear positioning direction (D) toward the said temporary support means (13) and a second linear positioning direction (D) away from said temporary support means (13).

3. The pick-up device (10) of claim 2, wherein said pick-up head (12) comprises a gripping matrix (23) movable in an operating direction (F) transverse to said first and second linear positioning direction (D) and transverse to said transverse direction (T).

4. The pick-up device (10) of claim 1, wherein each lateral support (16) comprises a base plate (31) from which pegs, or pins, (32) project vertically to define straightening channels (33) therebetween, wherein said straightening channels are defined to accommodate for the passage of said at least one bar (B).

5. The pick-up device (10) of claim 1, wherein each of said vertically movable secondary supports (17) are aligned in said transverse direction (T) and equally spaced apart so as to sustain said at least one bar (B) the entire length of said at least one bar (B).

6. An apparatus (100) for feeding a bar (B) comprising a feed plane (111) on which a plurality of bars (B) is able to be disposed, and a delivery plane (112) downstream of said feed plane (111), wherein said apparatus comprises the pick-up device (10) of claim 1.

7. A pick-up device (10), comprising:
a support arm (11) terminally provided with a pick-up head (12), configured to selectively pick up and extract, from a feed plane (111), at least one bar (B) in order to position the bar on a delivery plane (112), wherein said pick-up device (10) comprises:
a temporary support means (13) comprising:
at least one central support (14) provided with seatings (30) configured to support a central portion (b1) of said at least one bar (B), and
lateral supports (16) movable away from said central support (14) in a transverse direction (T), said lateral supports (16) configured to support and extract lateral portions (b2, b3) of said at least one bar (B) to align said lateral portions to said central portion (b1),
wherein said support arm (11) is configured to move said pick-up head (12) in a first linear positioning direction (D) toward the said temporary support means (13) and a second linear positioning direction (D) away from said temporary support means (13),
wherein said pick-up head (12) comprises a gripping matrix (23) movable in an operating direction (F) transverse to said first and second linear positioning direction (D) and transverse to said transverse direction (T), and
wherein said gripping matrix (23) is made, or coated, in whole or in part, with a magnetic material or an electromagnetic material, and has a gripping surface

(26) provided with a plurality of gripping seatings (27), wherein said plurality of gripping seatings have a downward concavity and wherein each of said plurality of gripping seatings is separated by a predetermined pitch (P).

8. The pick-up device (10) of claim 7, wherein said seatings (30) are separated by said predetermined pitch (P), and wherein said seatings (30) have a greater depth than a transverse measurement of said bars (B), and wherein said seatings (30) are disposed on a first facing row and a second facing row, wherein said first facing row and said second facing row are separated in said transverse direction (T) by an internal distance (L) greater than a width (W) of said gripping matrix (23).

9. A method for picking up bars (B), the method comprising:

selectively picking up and extracting at least one of said bars (B) disposed on a feed plane (111) of an apparatus (100) for feeding said bars (B), and positioning said at least one bar (B) downstream on a delivery plane (112) of said apparatus (100) with a pick-up device (10) by moving a support arm (11) terminally provided with a pick-up head (12), wherein said method provides temporarily supporting said at least one bar (B) on a temporary support means (13) comprising at least one central support (14) provided with seatings (30) to support a central portion (b1) of said at least one bar (B), lateral supports (16) movable away from said central support (14) in a transverse direction (T) to support and extract respective lateral portions (b2, b3) of said at least one bar (B) to align said lateral portions to said central portion (b1), and vertically movable secondary supports (17) disposed at a lower height than that of said central support (14) and said lateral supports (16).

* * * * *